United States Patent [19]

Carter et al.

[11] Patent Number: 6,103,807
[45] Date of Patent: Aug. 15, 2000

[54] ETHYLENE-POLYMER-BASED COMPOSITION, PROCESS FOR OBTAINING AND USING SAME

[75] Inventors: Stephen J. Carter, Houston, Tex.; Laurent Cardon, Brussels; Wim Coppens, Destelbergen, both of Belgium

[73] Assignee: Solvay Polyolefins Europe-Belgium (Societe Anonyme), Brussels, Belgium

[21] Appl. No.: 09/044,236

[22] Filed: Mar. 19, 1998

[51] Int. Cl.⁷ ......................................................... C08J 3/24
[52] U.S. Cl. .......................... 524/481; 524/483; 524/848; 524/586; 524/587
[58] Field of Search .................................... 524/481, 483, 524/848, 586, 587

[56] References Cited

U.S. PATENT DOCUMENTS 4,510,031  4/1985  Matsumura et al. ................... 521/50.5

FOREIGN PATENT DOCUMENTS 0 453 204 A1  10/1991  European Pat. Off. .
1 529 844  10/1978  United Kingdom .

OTHER PUBLICATIONS

"The Reactive modification of Polyethylene. I: The Effect of Low Initiator Concentrations on Molecular Properties"; D. Suwanda & S.T. Balke; *Polymer Engineering and Science,* Dec. 1993, vol. 33, No. 24; pp. 1585–1591.

*Primary Examiner*—Robert Dawson
*Assistant Examiner*—Kuo-Liang Peng
*Attorney, Agent, or Firm*—Oblon, Spivak, McClelland, Maier & Neustadt, P.C.

[57] ABSTRACT

An ethylene-polymer-based composition obtained by mixing, in the melt:

100 parts by weight of an ethylene polymer with from 0.0005 to 0.1 part by weight of a compound (a) with the ability to generate free radicals and from 0.0005 to 0.1 part by weight of coagent (b) chosen from among the $C_3$ to $C_{12}$ alkenes and the $C_5$ to $C_{16}$ alkadienes.

This composition has clearly improved melt strength. It is very suitable for extrusion and rotational molding and in particular for the extrusion of tubes intended for conveying fluids under pressure. The invention also relates to a process for obtaining the composition and using it for the manufacture of shaped articles, and to shaped articles.

25 Claims, No Drawings

ETHYLENE-POLYMER-BASED COMPOSITION, PROCESS FOR OBTAINING AND USING SAME

The present invention relates to an ethylene-polymer-based composition having improved rheological properties in the melt. It also relates to a process for obtaining this composition as well as for using it for the manufacture of shaped articles. Finally, it relates to shaped articles containing this composition.

Polyethylene is a semicrystalline thermoplastic polymer that has numerous applications, especially in the area of extrusion of tubes, sheathing of cables by extrusion, and rotational molding. Nevertheless, its melt strength and therefore elongational viscosity are not optimum for the manufacture of thick-walled articles by such forming processes.

It is known that the melt properties of polyethylene can be improved by mixing it in molten condition with very small quantities of peroxides (D. Suwanda and S. T. Balke, Polymer Engineering and Science, December 1993, Vol. 33, No. 24, pp. 1585–1592, especially p. 1586). The modified polyethylene obtained in this way does not exhibit notable cross-linking.

Another suggestion that has also been made already is to cross-link polyethylene by means of peroxides, used in clearly higher proportion (of at least 0.3 wt %), in a mixture with 2,4-diphenyl-4-methyl-1-pentene, the latter having substantially the effect of reducing the scorching effect, or in other words the premature cross-linking that leads to surface defects (European Patent Application EP A 0453204).

The object of the present invention is to provide a modified-polyethylene-based composition, the melt strength of which is further improved and which does not exhibit notable cross-linking. To this end, the invention relates to a new ethylene-polymer-based composition, characterized in that it is obtained by mixing, in the melt:

100 parts by weight of an ethylene polymer with from 0.0005 to 0.1 part by weight of a compound (a) with the ability to generate free radicals and from 0.0005 to 0.1 part by weight of coagent (b) chosen from among the $C_3$ to $C_{12}$ alkenes and the $C_5$ to $C_{16}$ alkadienes.

The compositions according to the invention have a clearly higher apparent melt viscosity at low velocity gradient [sic: low shear rate], a clearly smaller melt index and a broader molecular weight distribution by comparison with polyethylene treated in the melt solely with small quantities of peroxides. By virtue of this fact, they are particularly suitable for manufacture, by extrusion and rotational molding, of large-size and/or thick-walled shaped articles having excellent surface properties.

A surprising effect of the present invention is the large synergy effect resulting from the use together with free-radical generator compound (a) of a coagent (b) chosen from among the alkenes and the alkadienes such as defined hereinabove, in view of the fact that the latter have practically no effect on the melt strength of the compositions when they are used in the absence of free-radical generators. In addition, the compositions according to the invention are cross-linked only slightly or not at all. In general, the proportion of insolubles in hot xylene measured according to ISO Standard 6427 (extraction for 25 minutes at 140° C.) is less than 5%, more particularly 2% and most often 1%.

The ethylene polymer used in the compositions according to the invention is chosen from among the ethylene homopolymers and the ethylene copolymers with one or more comonomers, as well as mixtures thereof.

Among the usable comonomers there can be mentioned the straight-chain or branched olefins containing from 3 to 8 carbon atoms, such as butene, hexene and 4-methylpentene, as well as diolefins comprising from 4 to 8 carbon atoms, such as 4-vinylcyclohexene, dicyclopentadiene, 1,3-butadiene, etc. The preferred comonomers are butene and hexene. In general, the total content of comonomer(s) in the ethylene copolymer is at least 0.01 mol % and most often at least 0.05 mol %. The total proportion of comonomer(s) usually does not exceed 10 mol % and most often 5 mol %. Good results are obtained with ethylene copolymers containing in total from 0.05 to 5 mol % and more particularly from 0.3 to 2 mol % of butene and/or hexene. By way of non-limitative examples of ethylene copolymers advantageously used in the compositions according to the invention, there can be mentioned the statistical copolymers and terpolymers of ethylene and butene and/or hexene, or else the copolymers with bimodal molecular weight distribution obtained by block polymerization of mixtures of ethylene and butene and/or hexene. The copolymers of bimodal distribution obtained by block polymerization of ethylene and a mixture of ethylene and butene are particularly suitable.

The ethylene polymer used in the compositions according to the present invention generally has a standard density, measured according to ISO Standard 1183 (1987), of at least 920 kg/m$^3$, most often at least 930 kg/m$^3$ and more particularly at least 935 kg/m$^3$. In general, the standard density does not exceed 960 kg/m$^3$ and more particularly 955 kg/m$^3$.

Most often, the ethylene polymer used in the compositions according to the invention is additionally characterized by a melt index, measured at 190° C. under a load of 5 kg according to ISO Standard 1133 (1991), of at least 0.1 g/10 min, values of at least 0.2 g/10 min being most common. The melt index generally does not exceed 10 g/10 min and most often 5 g/10 min.

The ethylene polymer used in the compositions according to the invention can be obtained by any known polymerization process and in the presence of the usual catalysts for this type of polymerization, such as catalysts of the Phillips or Ziegler type.

Compound (a) with the ability to generate free radicals is most often chosen from among the organic peroxides, the persulfates and the diazo compounds (and mixtures thereof). The organic peroxides are preferred. By way of non-limitative examples of peroxides that can be used alone or in mixtures in the composition according to the invention, there can be mentioned the diaryl, alkylaryl and dialkyl peroxides such as dicumyl peroxide, t-butylcumyl peroxide and 2,5-dimethyl-2,5-di(t-butylperoxy)hexane (DHBP) or even the peresters such as ethyl 3,3-bis(t-butylperoxy)butyrate and ethyl 3,3-bis(t-amylperoxy)butyrate. The most suitable peroxides are those which decompose at the temperatures at which mixing in the melt is performed. 2,5-Dimethyl-2,5-di(t-butylperoxy)hexane (DHBP) has yielded excellent results.

The quantity of compound (a) with the ability to generate free radicals is most often between 0.001 and 0.08 part per 100 parts by weight of polyethylene. Good results are obtained by using from 0.01 to 0.06 part by weight of compound (a).

Coagent (b) is chosen from among the $C_3$ to $C_{12}$ alkenes and the $C_5$ to $C_{16}$ alkadienes (and mixtures thereof). Preference is given to the $C_6$ to $C_{10}$ alkenes, more particularly the $C_6$ to $C_{10}$ straight-chain alkenes, and very particularly the $C_6$ to $C_{10}$ straight-chain alkenes having a terminal double bond. A very particularly preferred alkene is 1-octene. In addition, preference is given to the $C_6$ to $C_{14}$ alkadienes, more particularly the nonconjugated $C_6$ to $C_{10}$ alkadienes, and very particularly the $C_6$ to $C_{10}$ alkadienes having terminal double bonds. A very particularly preferred alkadiene is 1,9-decadiene.

The quantity of coagent (b) used is most often between 0.001 and 0.08 part per 100 parts by weight of polyethylene. Good results are obtained by using 0.01 to 0.06 part by weight of compound (b).

The weight ratio of the quantity of compound (a) and compound (b) used can vary from 0.10 to about 10. Most often, this ratio varies from 0.2 to 2.5.

The compositions according to the invention are obtained by mixing the different constituents in the melt. Most often, this mixing in the melt is performed under temperature and time conditions such that at least partial reaction of the molecules of coagent (b) with the ethylene polymer takes place.

The conditions under which such mixing is performed are not critical, provided they induce at least partial melting of the ethylene polymer. Preferably they are such that complete melting of the ethylene polymer takes place.

In general, mixing is performed at a temperature not exceeding 300° C.; preferably, this temperature does not exceed 250° C. The minimum temperature at which mixing in the melt is performed is generally higher than or equal to 140° C., and preferably it is higher than or equal to 150° C. Good results are obtained when this temperature is higher than or equal to 180° C. and does not exceed 240° C.

The mixing time is chosen as a function of the nature of compounds (a) and (b) and of the mixing temperature. This time generally varies from 2 seconds to 10 minutes, most often from 5 seconds to 5 minutes. The optimum time can be evaluated advantageously by preliminary tests.

Mixing of the ethylene polymer with compounds (a) and (b) can be performed in any device known for this purpose. For example, internal or external kneaders can be used. The internal kneaders are the most appropriate, and among these the batch kneaders of the BRABENDER type and the continuous kneaders such as the extruders. Extruders are generally preferred.

The order of introduction of the different constituents of the ethylene-polymer-based composition according to the invention is not critical. It is immaterial whether they are introduced individually or successively into the ethylene polymer. The well-known mixing technique via a master mixture can also be used. An advantageous method comprises first making premixes by incorporating all of the free-radical-generating compound (a) and of coagent (b) in one portion of the ethylene polymer to form one or more free-flowing powdered premixes, and then mixing such premix(es) with the remaining ethylene polymer at the same time as any other additives to the composition, such as the conventional additives (antioxidants, anti-acid agents, lubricants, etc.), fillers, pigments, etc. The premix generally contains about 0.5 to 15 parts by weight of compounds (a) and (b) per 100 parts of ethylene polymer.

The compositions according to the invention can be in the state of granules obtained by known means, by extruding the composition and cutting the rod emerging from the extruder into granules. They can also be in the state of powders obtained by crushing or micronizing the granules.

The compositions according to the invention can be used by all classical processes for manufacture of shaped articles of ethylene polymer, such as processes of extrusion, extrusion blow-molding, extrusion thermoforming and injection molding, as well as for rotational molding. They are very suitable for use by extrusion (in the state of granules) and for rotational molding (in the powdered state), and more particularly for the extrusion of tubes and sheathing of cables by extrusion. They are very particularly suitable for the extrusion of tubes intended for conveying fluids under pressure, such as water and gas, and especially for large-diameter tubes.

The composition according to the invention generally also has a melt index, measured at 190° C. under a load of 5 kg according to ISO Standard 1133 (1991), of at least 0.05 g/10 min. Most often, this index does not exceed 5.0 g/10 min. When the composition is intended for the extrusion of granules, it advantageously has a melt index, measured at 190° C. under a load of 5 kg according to ISO Standard 1133 (1991), equal to at least 0.1 g/10 min and not exceeding 1 g/10 min. When intended for rotational molding by means of powders, it advantageously has a melt index, measured at 190° C. under a load of 5 kg according to ISO Standard 1133 (1991), equal to at least 2 g/10 min and not exceeding 5 g/10 min.

The compositions according to the invention are used for processing to shaped articles under the usual conditions for using ethylene polymers in molten condition. In general, the operating temperature is at least equal to 150° C. and does not exceed 300° C. Most often, the operating temperature is at least equal to 180° C. and does not exceed 240° C.

The examples hereinafter are intended to illustrate the compositions according to the invention. The significance of the symbols used in these examples (as well as in the reference examples), the units expressing the variables mentioned, and the methods of measuring these variables, are explained below.

MVS=standard density measured at 23° C. according to ASTM Standard D 972

$MI_5$=melt index measured at 190° C. under a load of 5 kg according to ISO Standard 1133 (1991)

$\mu_0$=apparent relative viscosity of the melt at 1 $sec^{-1}$ (measured at 190° C. through a conical 0.2/2 mm die)

$\mu_2$=apparent relative viscosity of the melt at 100 $sec^{-1}$ (measured at 190° C. through a conical 0.2/2 mm die)

Example 1, for reference, relates to a polyethylene composition free of peroxide and coagent.

Example 2, for reference, relates to a polyethylene composition containing peroxide and free of coagent.

Example 3, for reference, relates to a polyethylene composition containing 1-octene as coagent and free of peroxide.

Example 4, according to the invention, relates to a polyethylene composition containing peroxide and 1-octene (coagent).

Example 5, for reference, relates to a polyethylene composition containing 1,9-decadiene and free of peroxide.

Example 6, according to the invention, relates to a composition containing peroxide and 1,9-decadiene (coagent).

In all the examples there was used an ethylene copolymer comprising a bimodal molecular weight distribution with standard density of 949 kg/m³ and $MI_5$ of 0.45 g/10 min, containing 0.25 wt % of phenolic antioxidant and 0.1 wt % of anti-acid agent. This copolymer, obtained by Ziegler-type catalysis, comprised 50 wt % of an ethylene homopolymer and 50 wt % of a copolymer of ethylene and 1-butene comprising 1 mol % of monomeric units derived from 1-butene. The organic peroxide used in the examples was 2,5-dimethyl-2,5-di(t-butylperoxy)hexane (DHBP). The coagent used in Examples 3 (for reference) and 4 (according to the invention) was 1-octene. The coagent used in Examples 5 (for reference) and 6 (according to the invention) was 1,9-decadiene.

The peroxide was used in a proportion of 0.02 part and the coagent in a proportion of 0.05 part by weight per 100 parts of polyethylene.

The compositions of the examples were produced according to the following procedure.

A premix was first prepared ("premix 1") by progressively incorporating, at room temperature, 10 parts by weight of peroxide in 90 parts by weight of virgin polyethylene in a slow mixer rotating at 60 rpm for 5 minutes to obtain a free-flowing powder.

A second premix ("premix 2") containing 10 wt % of coagent (b) was prepared by operating under the same conditions as for premix 1.

Into a high-speed mixer rotating at 1000 rpm there were then introduced 2 g of the first premix (containing 10 wt % of DHBP), 5 g of the second premix (containing 10 wt % of coagent (b): 1-octene or 1,9-decadiene depending on the case), 1 g of anti-acid agent, 2.5 g of a phenolic antioxidant and 989.5 g of virgin polyethylene. The mixture obtained was maintained in the high-speed mixer at 23° C. for 2 minutes.

The polyethylene composition obtained was then extruded under nitrogen at 240° C. on a mini-extruder of the AXON type (18 mm) with a screw speed of 125 mm rpm and the following temperature profile: 240° C.-240° C.-240° C.-220° C.-195° C.-165° C.

The compositions according to Examples 4 and 6 are completely soluble in hot xylene (extraction for 25 minutes at 140° C. according to ISO Standard 6427). They have a melt index of about 0.2 g/10 min (see Table I).

Table I also contains the results of the following measurements on compositions produced according to Examples 1 to 6: $MI_5$ (measured on granules extruded under nitrogen), $\mu_0$ and $\mu_2$, as well as $\mu_0/\mu_2$.

Comparison of the results of Examples 2 (R) with those of Example 4 according to the invention sufficiently shows the notable reduction of melt index $MI_5$ and the notable increase of apparent relative melt viscosity at low ($\mu_0$) and high ($\mu_2$) shear rate resulting from the joint use of organic peroxide and 1-octene. The clearly higher $\mu_0/\mu_2$ ratio indicates appreciable broadening of the molecular weight distribution. Comparison of the results of Examples 3 (R) and 4 shows that 1-octene on its own has no significant effect on these variables.

Similarly, comparison of the results of Examples 2 (R) and 5 (R) with those of Example 6 shows an identical effect in the case of use of peroxide with 1,9-decadiene as coagent.

TABLE I

[see original for numbers; for 0,614 read 0.614; for 325,7 read 325.7, etc,]
N° exemple = Example No.

| N° example | $MI_5$ | $\mu_0$, $10^3$ Pas | $\mu_2$, $10^3$ Pas | $\mu_0/\mu_2$ |
|---|---|---|---|---|
| 1(R) | 0.614 | 325.7 | 48 | 6.79 |
| 2(R) | 0.590 | 339.4 | 48.4 | 7.01 |
| 3(R) | 0.56 | 358.9 | 49.5 | 7.25 |
| 4 | 0.19 | 1180 | 60.6 | 19.47 |
| 5(R) | 0.50 | 379.8 | 52.8 | 7.19 |
| 6 | 0.18 | 1232 | 61.2 | 20.13 |

What is claimed is:

1. An ethylene homo or copolymer composition, characterized in that it is obtained by mixing, in the melt:
   100 parts by weight of an ethylene homo or copolymer with
   from 0.0005 to 0.1 part by weight of a compound (a) with the ability to generate free radicals and
   from 0.0005 to 0.1 part by weight of coagent (b) selected from the group consisting of $C_3$ to $C_{12}$ alkenes and $C_5$ to $C_{16}$ alkadienes and mixtures thereof.

2. The composition according to claim 1, characterized in that compound (a) with the ability to generate free radicals is selected from the group consisting of organic peroxides, persulfates, diazo compounds and mixtures thereof.

3. The composition according to claim 2, characterized in that compound (a) with the ability to generate free radicals is an organic peroxide.

4. The composition according to claim 3, characterized in that the organic peroxide is 2,5-dimethyl-2,5-di(t-butylperoxy)hexane.

5. The composition according to claim 1, characterized in that coagent (b) is selected from the group consisting of $C_6$ to $C_{10}$ straight-chain alkenes and $C_6$ to $C_{12}$ nonconjugated straight-chain alkadienes and mixtures thereof.

6. The composition according to claim 5, characterized in that coagent (b) is selected from the group consisting of 1-octene and 1,9-decadiene and mixtures thereof.

7. The composition according to claim 1, characterized in that compound (a) with the ability to generate free radicals and coagent (b) are used in proportions of 0.001 to 0.08 part per 100 parts of ethylene polymer.

8. The composition according to claim 1, characterized in that the weight ratio of free-radical-generating compound (a) and coagent (b) is between 0.1 and 10.

9. A process, comprising a step of mixing, in the melt:
   100 parts by weight of an ethylene homo or copolymer with
   from 0.0005 to 0.1 part by weight of a compound (a) with the ability to generate free radicals and
   from 0.0005 to 0.1 part by weight of coagent (b) selected from the group consisting of $C_3$ to $C_{12}$ alkenes and $C_5$ to $C_{16}$ alkadienes and mixtures thereof.

10. The process according to claim 9, characterized in that mixing in the melt is performed at a temperature which is higher than or equal to 140° C. and does not exceed 300° C. for a duration of 2 seconds to 10 minutes.

11. A shaped article, comprising the composition as claimed in claim 1.

12. The shaped article according to claim 11, which is produced by extruding or rotational molding the composition.

13. The shaped article according to claim 11, wherein the shaped article is an extruded tube.

14. The shaped article according to claim 13, wherein the extruded tube is suitable for conveying fluids under pressure.

15. An ethylene homo- or copolymer composition, produced by the process as claimed in claim 9.

16. The composition according to claim 1, wherein the ethylene homo or copolymer is selected from the group consisting of ethylene homopolymer, ethylene copolymer and mixtures thereof.

17. The composition according to claim 1, wherein the ethylene homo or copolymer is a copolymer of ethylene and at least one comonomer unit selected from the group consisting of $C_3$–$C_8$ straight-chain or branched olefin, butene, hexene, 4-methylpentene, $C_4$–$C_8$ diolefins, 4-vinylcyclohexene, dicyclopentadiene, and 1,3-butadiene and mixtures thereof.

18. The composition according to claim 1, wherein the ethylene homo or copolymer is a copolymer of ethylene and at least one comonomer unit selected from the group consisting of butene and hexene and mixtures thereof.

19. The composition according to claim 1, wherein the ethylene homo or copolymer is selected from the group consisting of statistical copolymers and terpolymers of ethylene and butene, statistical copolymers and terpolymers of ethylene and hexene, statistical copolymers and terpolymers of ethylene and butene and hexene, copolymers with bimodal molecular weight distribution obtained by block copolymerization of mixtures of ethylene and butene, copolymers with bimodal molecular weight distribution obtained by block copolymerization of mixtures of ethylene and hexene, copolymers with bimodal molecular weight distribution obtained by block copolymerization of mixtures of ethylene and butene and hexene, and copolymers with bimodal molecular weight distribution obtained by block copolymerization of ethylene and a mixture of ethylene and butene.

20. The composition according to claim 17, wherein the total content of comonomer in the ethylene copolymer is at least 0.01 mol %.

21. The composition according to claim 17, wherein the total content of comonomer in the ethylene copolymer is at least 0.05 mol %.

22. The composition according to claim 17, wherein the total content of comonomer in the ethylene copolymer does not exceed 10 mol %.

23. The composition according to claim 17, wherein the total content of comonomer in the ethylene copolymer is from 0.05 to 5 mol %.

24. The composition according to claim 18, wherein the total content of comonomer in the ethylene copolymer is from 0.05 to 5 mol %.

25. The composition according to claim 18, wherein the total content of comonomer in the ethylene copolymer is from 0.3 to 2 mol %.

* * * * *